United States Patent
Yu et al.

(10) Patent No.: US 8,581,714 B2
(45) Date of Patent: Nov. 12, 2013

(54) METHOD AND APPARATUS FOR GENERATING VEHICLE VIBRATION TO ALERT VEHICLE USER OF WARNING

(75) Inventors: Hai Yu, Canton, MI (US); Ming Lang Kuang, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 13/112,440

(22) Filed: May 20, 2011

(65) Prior Publication Data

US 2012/0293313 A1 Nov. 22, 2012

(51) Int. Cl.
*B60Q 1/00* (2006.01)
*B60T 8/64* (2006.01)
*B60T 13/74* (2006.01)
*A01B 69/00* (2006.01)
*B60L 9/00* (2006.01)
*H04B 3/36* (2006.01)
*G06F 3/033* (2013.01)

(52) U.S. Cl.
USPC ............... 340/435; 303/151; 303/3; 701/41; 701/22; 340/407.1; 345/157

(58) Field of Classification Search
USPC ............... 340/435, 425; 303/151; 701/41
See application file for complete search history.

(56) References Cited

U.S. PATENT DOCUMENTS

| | | | |
|---|---|---|---|
| 6,751,534 B2 | 6/2004 | Robichaux et al. | |
| 2006/0217861 A1 | 9/2006 | Ihara et al. | |
| 2008/0189012 A1 | 8/2008 | Kaufmann | |
| 2009/0118887 A1* | 5/2009 | Minarcin et al. | 701/22 |
| 2012/0139329 A1* | 6/2012 | Fabini et al. | 303/3 |

FOREIGN PATENT DOCUMENTS

FR 2899172 A1 10/2007

* cited by examiner

*Primary Examiner* — George Bugg
*Assistant Examiner* — Jack K Wang
(74) *Attorney, Agent, or Firm* — David B. Kelley; Brooks Kushman P.C.

(57) ABSTRACT

A drive torque modulation is generated in response to an unintentional lane departure or traffic/obstacle intervention in an electric vehicle or a hybrid-electric vehicle (HEV). At least one of propulsion and braking of the vehicle is controlled via a motor of the vehicle in accordance with the torque modulation. Vehicle oscillation is generated through the torque modulation to let the driver be aware of the impending dangerous driving situation.

22 Claims, 2 Drawing Sheets

METHOD AND APPARATUS FOR GENERATING VEHICLE VIBRATION TO ALERT VEHICLE USER OF WARNING

TECHNICAL FIELD

The present invention relates to driver warning systems.

BACKGROUND

A lane departure avoidance (LDA) system is a type of driver warning system. A LDA system assists the driver in maintaining proper lane alignment by alerting the driver to a possible unintentional lane departure.

A LDA system relies on the detection of the vehicle position with respect to road lane markings in order to detect a lane departure. Different technologies have been applied including primarily vision based systems and other lane sensing methods. In a typical vision based system, the vehicle position is evaluated by a camera and an image processing algorithm wherein an alarm is issued to alert the driver if an abnormal lane departure is detected. Alternatively, a LDA system may include a rumble strip sensing component to detect an amount of rumble strip engagement from a rumble strip to a vehicle wheel. Other technologies include magnetic strips and the like.

A LDA system includes a lane departure detection (LDD) subsystem and a lane departure warning (LDW) subsystem. The LDD subsystem recognizes the lane markings and road edges and estimates the position of the vehicle within the lane. In response to a positive lane departure detection being made, the LDW subsystem uses LDD subsystem information on the basis of a Time to Lane Crossing (TLC) calculation to provide an alert to the driver.

Typical LDW subsystems have been configured to generate audio, visual, and haptic (torque) feedback alerts to the driver in response to detection of an unintentional lane departure. The warning effectiveness and user acceptance of a group of warning methods has been evaluated when unintended lane departures are the result of drowsy driving. The steering wheel vibration HMI (human-machine interface) was found to be an effective HMI for a LDW subsystem in a group of drowsy drivers, with faster reaction times and smaller lane excursions.

Warning subsystems of driver warning systems like the typical LDW subsystems require additional devices to be installed on the vehicle in order to be able to generate the feedback alerts. The requirement for additional devices is especially true for those warning subsystems which generate the haptic vibration feedback alert that was found to be effective.

SUMMARY

In an embodiment, a method is provided. The method includes in response to a changed condition in a vehicle having a motor, controlling at least one of propulsion and braking of the vehicle via the motor according to a torque modulation signal that produces a haptic vibration.

In an embodiment, a system for a vehicle having a motor configured to propel and brake the vehicle. The system includes a detector and a warning generator. The detector is configured to detect for an event. The warning generator is configured to, in response to the event being detected, generate a torque modulation representative of a torque other than torque satisfying propulsion and braking of the vehicle as requested by a driver of the vehicle during the event. The warning generator is further configured to provide the torque modulation to the motor such that at least one of propulsion and braking of the vehicle is controlled via the motor according to the torque modulation.

In an embodiment, a vehicle is provided. The vehicle includes a motor configured to propel and brake the vehicle. The vehicle further includes a warning generator configured to, in response to an event being detected, generate a torque modulation representative of a torque other than torque satisfying propulsion and braking of the vehicle as requested by a driver of the vehicle during the event. The warning generator is further configured to provide the torque modulation to the motor such that at least one of propulsion and braking of the vehicle is controlled via the motor according to the torque modulation.

DETAILED DESCRIPTION

Figure 1:
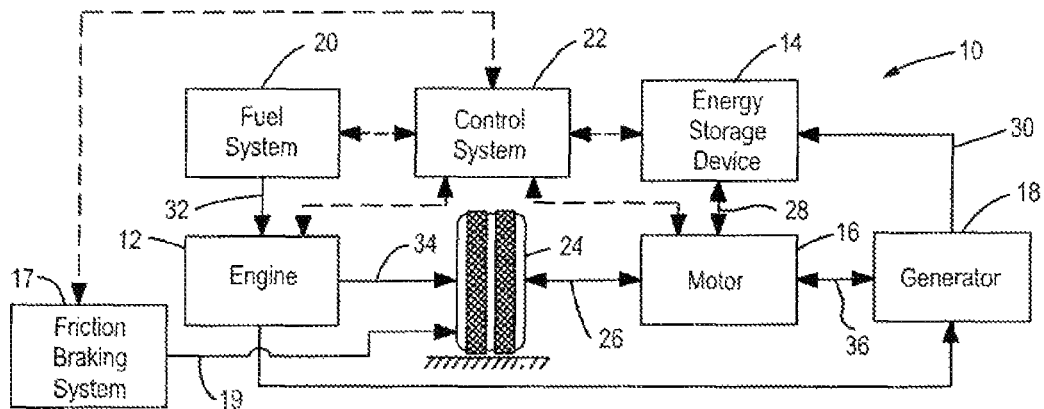
FIG. 1 illustrates a block diagram of a hybrid electric vehicle (HEV) capable of being controlled by a warning method and apparatus in accordance with embodiments of the present invention.

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As indicated above, a warning subsystem of a driver warning system alerts the driver in response to an event that the driver should be warned about being detected. For instance, a lane departure warning (LDW) subsystem of a lane departure avoidance (LDA) system alerts the driver in response to an unintentional lane departure being detected. As further indicated above, warning subsystems like the typical LDW subsystems require additional devices installed on the vehicle in order to be able to generate the alert.

Embodiments of the present invention provide an alternative mechanism that realizes, with relatively no additional cost, the warning subsystem of a driver warning system for a vehicle having a motor configured to at least one of propel and brake the vehicle and/or having a friction braking system configured to brake the vehicle. Such vehicles include hybrid electric vehicles (HEV), plug-in hybrid electric vehicles (PHEV), battery electric vehicles (BEV), and the like. The warning function is realized for such a vehicle in an innovative way without additional device installation by using at least one of the motor and the friction braking system to control at least one of propulsion and braking of the vehicle and thereby generate a warning in the form of vehicle vibration.

Certain embodiments are directed to realizing the LDW subsystem of a LDA system whereas other embodiments are directed to realizing the warning subsystem of driver warning systems configured to detect for events other than an unintentional lane departure. The general function of a driver warning system is to generate a warning alert when an event that the driver should be warned about is detected. An example used herein of such an event, in order to describe features of the present invention, is an unintended lane departure. However, the function of a driver warning system can be extended to generate a warning alert when it is detected or predicted that a certain vehicle maneuver, if continued, will cause interference to either surrounding traffic (vehicle or pedestrian) or to static obstacles in the path of the vehicle. As such, events that the driver should be warned about other than an unintentional lane departure include traffic and/or obstacle related events (e.g., surrounding vehicle, upcoming pedestrian, side or rear obstacles when driving backwards, etc.). Again, in this description, without loss of application generality, an unintentional lane departure warning is used as an example to explain embodiments of the present invention.

As indicated above, a warning method and apparatus in accordance with embodiments of the present invention take advantage of existing electric vehicle actuation and propulsion components in order to generate alarm signals to alert the driver of a detected event such as an unintended lane departure. As such, the warning function is realized for such a vehicle in an innovative way without additional device installation. Among other features, a warning method and apparatus in accordance with embodiments of the present invention are expected to have better warning flexibility, performance, and user acceptance.

Again, particular embodiments of the present invention provide a lane departure warning method and apparatus and a traffic/obstacle intervention warning method and apparatus. The lane departure warning method and apparatus is described herein as an example of a warning method and apparatus in accordance with embodiments of the present invention.

Referring now to FIG. 1, a block diagram of a hybrid electric vehicle (HEV) 10 capable of being controlled by a warning method and apparatus in accordance with embodiments of the present invention is shown. HEV 10 includes an engine 12, an energy storage device 14, a motor 16, a friction braking system 17, a generator 18, a fuel system 20, and a control system 22.

Energy storage device 14 may include a battery or a hydraulic or pneumatic fluid tank. For brevity, energy storage device 14 will be indicated in the detailed description as being a battery 14.

Likewise, motor 16 may be an electric motor, a hydraulic motor, or a pneumatic motor. Again, for brevity, motor 16 will be indicated in the detailed description as being an electric motor 16.

Engine 12 is configured to consume a fuel (e.g., gasoline) to produce an engine output. Battery 14 is configured to output and receive electrical energy and store received electrical energy. Motor 16 is configured to consume electrical energy to produce a motor output. Friction braking system 17 is configured to produce a brake output. Control system 22 is configured to send control signals to and receive sensory feedback information from one or more of engine 12, battery 14, motor 16, friction braking system 17, generator 18, and fuel system 20.

Fuel system 20 has a fuel tank for storing fuel on-board the vehicle. Fuel system 20 periodically receives fuel from a fuel source residing external the vehicle. Fuel system 20 delivers fuel to engine 12 as indicated by arrow 32, whereby the engine combusts the fuel to produce an engine output. The engine output may be used to propel the vehicle as indicated by arrow 34 and/or to recharge battery 14 via motor 16 or generator 18.

Battery 14 delivers electrical energy to motor 16 as indicated by arrow 28, whereby the motor consumes the electrical energy to produce a motor output. The motor output may be used to propel the vehicle as indicated by arrow 26.

Friction braking system 17 is configured to deliver a braking torque output to drive wheel 24 as indicated by arrow 19 in order to brake the vehicle.

HEV 10 can have various operating conditions. For example, engine 12 may propel vehicle via drive wheel 24 while motor 16 is deactivated. Motor 16 may propel the vehicle via wheel 24 while engine 12 is deactivated. Engine 12 and motor 16 may propel the vehicle at the same time via wheel 24. In some embodiments, engine 12 propels the vehicle via a first set of drive wheels and motor 16 propels the vehicle via a second set of drive wheels.

During other operating conditions, engine 12 is maintained in an off state while motor 16 is operated to charge battery 14. For example, motor 16 receives wheel torque from wheel 24 as indicated by arrow 26 where the motor converts kinetic energy of the vehicle to electrical energy for storage at battery 14 as indicated by arrow 28. This operation is referred to as regenerative braking of the vehicle. Thus, motor 16 can provide a generator function in some embodiments. In other embodiments, generator 18 instead receives wheel torque from wheel 24, where the generator converts kinetic energy of the vehicle to electrical energy for storage at battery 14 as indicated by arrow 30.

In other embodiments, HEV 10 is configured as a series type vehicle propulsion system, whereby engine 12 does not directly propel the vehicle. Rather, engine 12 is operated to power motor 16, which in turn propels the vehicle via wheel 24. For example, during select operating conditions, engine 12 drives generator 18, which in turn supplies electrical energy to motor 16 as indicated by arrow 36 and/or to battery 14 as indicated by arrow 30. As another example, engine 12 drives motor 16 and the motor provides a generator function to convert the engine output to electrical energy, where the electrical energy is stored at battery 14 for later use by the motor.

As described, a vehicle such as HEV 10 combines a conventional engine propulsion system with an electric propulsion system. The presence of the electric powertrain is intended to achieve better fuel economy and performance than a conventional vehicle. A variety of HEV types exist and the degree to which they can be propelled electrically varies as well. A common feature of a vehicle such as HEV 10 is that the motor can propel or brake the vehicle in addition to the engine and the foundation or friction braking system. In other words, the motor can work independently to operate the vehicle with only some electrical and system constraints.

The noted features enable a vehicle such as HEV 10 to execute drive torque modulations. A drive torque modulation is an ideal candidate for warning signal generation to provide sensible alerts to the driver. A drive torque modulation is an ideal candidate in that, similar to a vehicle running over a rumble strip where the vehicle is being excited by the road roughness, the drive torque modulation may exhibit small and high frequency oscillation to alert the driver. A warning method and apparatus in accordance with embodiments of the present invention simulate the vibration by feeding the motor of the vehicle with a pattern of disturbance torque signal and thereby excite the vehicle vibration without external stimuli such as from rumble strips.

Figure 2:
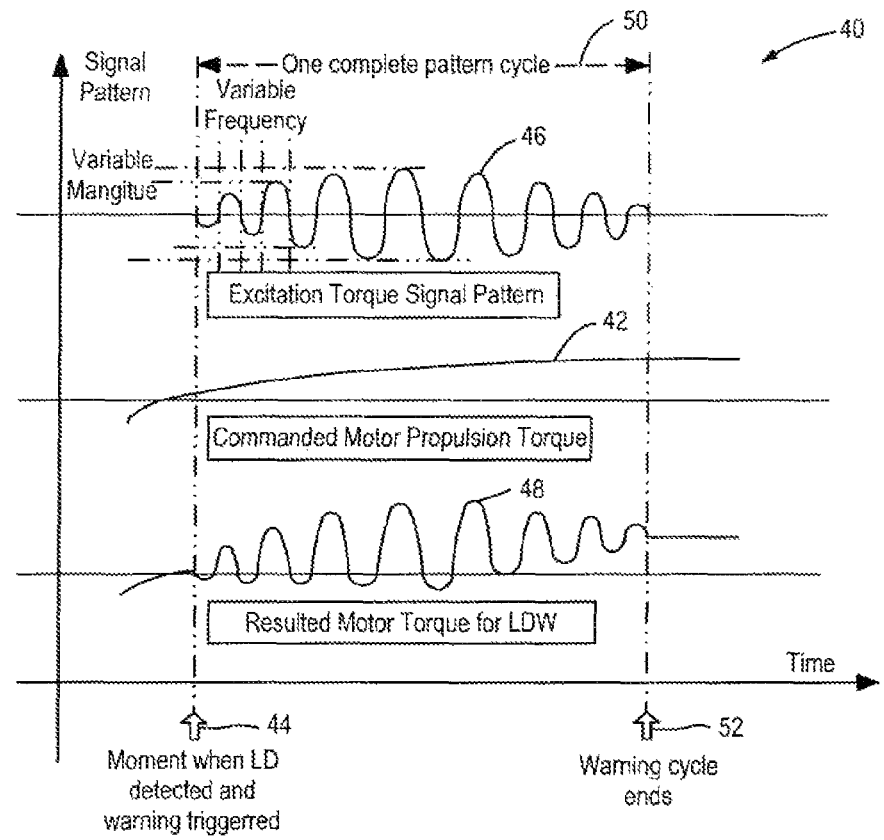
FIG. 2 illustrates a plot related to operation of a lane departure warning method and apparatus in accordance with an embodiment of the present invention.

Referring now to FIG. 2, with continual reference to FIG. 1, a plot 40 related to operation of a lane departure warning method and apparatus for a vehicle such as HEV 10 in accordance with an embodiment of the present invention is shown. In operation, control system 22 generates a current motor torque command signal 42 (labeled "Commanded Motor Propulsion Torque" in FIG. 2). Control system 22 provides current motor torque command signal 42 to motor 16 as is done during typical operation to propel or brake the vehicle. Concurrently, control system 22 may control engine 12 as is done during typical operation to propel the vehicle or control friction braking system 17 as is done during typical operation to brake the vehicle.

Upon an unintentional lane departure being detected as indicated at 44, the operation of the lane departure warning method and apparatus further includes control system 22 generating a disturbance alerting signal 46 (labeled "Excitation Torque Signal Pattern" in FIG. 2). In turn, control system 22 sums disturbance alerting signal 46 and current motor torque command signal 42 to generate a resulted motor torque command signal 48 (labeled "Resulted Motor Torque for LDW" in FIG. 2). Subsequently, control system 22 provides resulted motor torque command signal 48 in lieu of just only current motor torque command signal 42 to motor 16.

As can be expected, the operation of the vehicle in response to motor 16 receiving resulted motor torque command signal 48 is different than if motor 16 had only received current motor torque command signal 42. The difference in operation of the vehicle is a result of motor 16 receiving disturbance alerting signal 46 (i.e., a component of resulted motor torque command signal 48). In particular, the difference in operation of the vehicle is that the vehicle will have some sort of vibration, for example, similar to vibration encountered by the vehicle from rumble strips. The vibration of the vehicle is a result of motor 16 being fed disturbance alerting signal 46. In particular, motor 16 may propel or brake the vehicle in accordance with disturbance alerting signal 46 which in turn causes the vibration of the vehicle. In this example, disturbance alerting signal 46 is intended to cause motor 16 to control the vehicle such as if the vehicle is encountering rumble strips. In effect, disturbance alerting signal 42 is a drive torque modulation which represents some sort of simulated vehicle vibration.

Control system 22 generates disturbance alerting signal 46 to thereby provide resulted motor torque command signal 48 to motor 16 during a given warning cycle as indicated at 50. Upon warning cycle 50 being completed as indicated at 52, control system 22 stops the generation of disturbance alerting signal 46. Of course, if the unintentional lane departure is still detected after warning cycle 50 completes, then control system 22 starts the process anew by generating disturbance alerting signal 46 to thereby provide resulted motor torque command signal 48 to motor 16 during a subsequent warning cycle 50.

As such, disturbance alerting signal 46 is sent to motor 16 as commanded motor torque disturbance. Disturbance alerting signal 46 is added to current motor torque command signal 42 to generate vehicle oscillation without compromise to the normal vehicle driving torque request from the driver.

A more detailed analysis of the generation of resulted motor torque command signal 48 for provoking vehicle vibration will now be provided. As indicated above, the friction brakes of friction braking system 17 are configured to brake the vehicle during operation of the vehicle. Neither engine 12 nor motor 16 get involved with vehicle braking normally. However, in this case, motor 16 can still generate superimposing excitation torque as disturbance to the friction brake torque at drive wheels 24 to generate vehicle vibration.

The nominal motor torque ($\tau_{mot}$) (i.e., current motor torque command signal 42) can be either positive for drive, negative for braking, or just equal to zero. Control system 22 determines the nominal motor torque ($\tau_{mot}$) to satisfy the vehicle propulsion or braking as requested by the driver.

The final commanded motor torque ($\tau_{mot\_cmd}$) (i.e., resulted motor torque command signal 48) is the final arbitrated motor torque to be delivered by motor 16 to the drivetrain or on drive wheels 24. Normally, $\tau_{mot\_cmd}=\tau_{mot}$ (i.e., normally resulted motor torque command signal 48 is just current motor torque command signal 42 by itself).

The final wheel torque will be: $\tau_{whl}=\tau_{whl\_eng}+\tau_{whl\_mot}+\tau_{whl\_fri}$, where $\tau_{whl\_eng}$ is engine torque on the wheels, $\tau_{whl\_mot}$ is the motor torque on the wheels ($\tau_{whl\_mot}=\tau_{mot\_cmd}*\rho$, where $\rho$ represents some motor to wheel torque ratio), and $\tau_{whl\_fri}$ indicates the friction braking torque on the wheels ($\tau_{whl\_fri}$ is negative to the propulsion only). This is the normal requested wheel torque.

The motor modulation torque ($\tau_{mot\_mod}$) (i.e., disturbance alerting signal 46), in the time domain, is a high-frequency oscillation signal. The motor modulation torque ($\tau_{mot\_mod}$) can be both positive and negative like a sinusoidal signal, or just be positive/negative only like sawtooth/square waves.

In a motor torque modulation event, the final commanded motor torque ($\tau_{mot\_cmd}$) is the sum of the nominal motor torque ($\tau_{mot}$) and the motor modulation torque ($\tau_{mot\_mod}$) (i.e., resulted motor torque command signal 48=current motor torque command signal 42+disturbance alerting signal 46). That is, $\tau_{mot\_cmd}=\tau_{mot}+\tau_{mot\_mod}$, such that $\tau_{whl}=\tau_{whl\_eng}+(\tau_{mot}*\rho)+(\tau_{mot\_mod}*\rho)+\tau_{whl\_fri}$.

In general, the resulted wheel torque due to motor torque modulation will be either larger or less (equal) than the requested wheel torque alternatively in a high-frequency manner.

The motor torque modulation includes the following cases: 1. vehicle propulsion; 2. vehicle creeping; 3. vehicle regenerative braking; and 4. vehicle braking with friction brake only.

In the first two cases, $\tau_{whl\_eng} \geq 0$, $\tau_{mot} \geq 0$, and $\tau_{whl\_fri}=0$ and $\tau_{mot\_mod}$ is actively added. Since the modulation motor torque can either be negative or positive, it is possible that the total wheel torque is negative in a drive situation or is positive in a braking situation. However, since the excitation modulation torque is small and in high frequency, it will not bring drivability issue to the vehicle.

In the third case, $\tau_{whl\_eng} \geq 0$, $\tau_{mot}<0$, and $\tau_{whl\_fri} \leq 0$, but is otherwise the same as the first two cases.

In the fourth case, $\tau_{whl\_eng} \geq 0$, $\tau_{mot}=0$, and $\tau_{whl\_fri} \leq 0$. The vehicle is purely braked by the friction brake. Now the additionally generated powertrain motor modulation torque will be a disturbance torque to the friction brake to make it brake less and more alternatively in a high frequency manner to generate vehicle vibration.

As shown in FIG. 2, disturbance alerting signal 46 is designed with a given pattern. Such patterns are defined by a combination of magnitude, frequency, and timing parameters to shape the profile of the disturbance in a repetitive time interval such that the resulted vehicle oscillation is effective to alert the driver of a potential lane departure event and is optimized for driver comfort and acceptance. An example of the pattern of disturbance alerting signal 46 is a pattern designed to mimic the effect of the vehicle running through a rumble strip together with some active sound emulation effect to wake up a drowsy driver.

Figure 3:
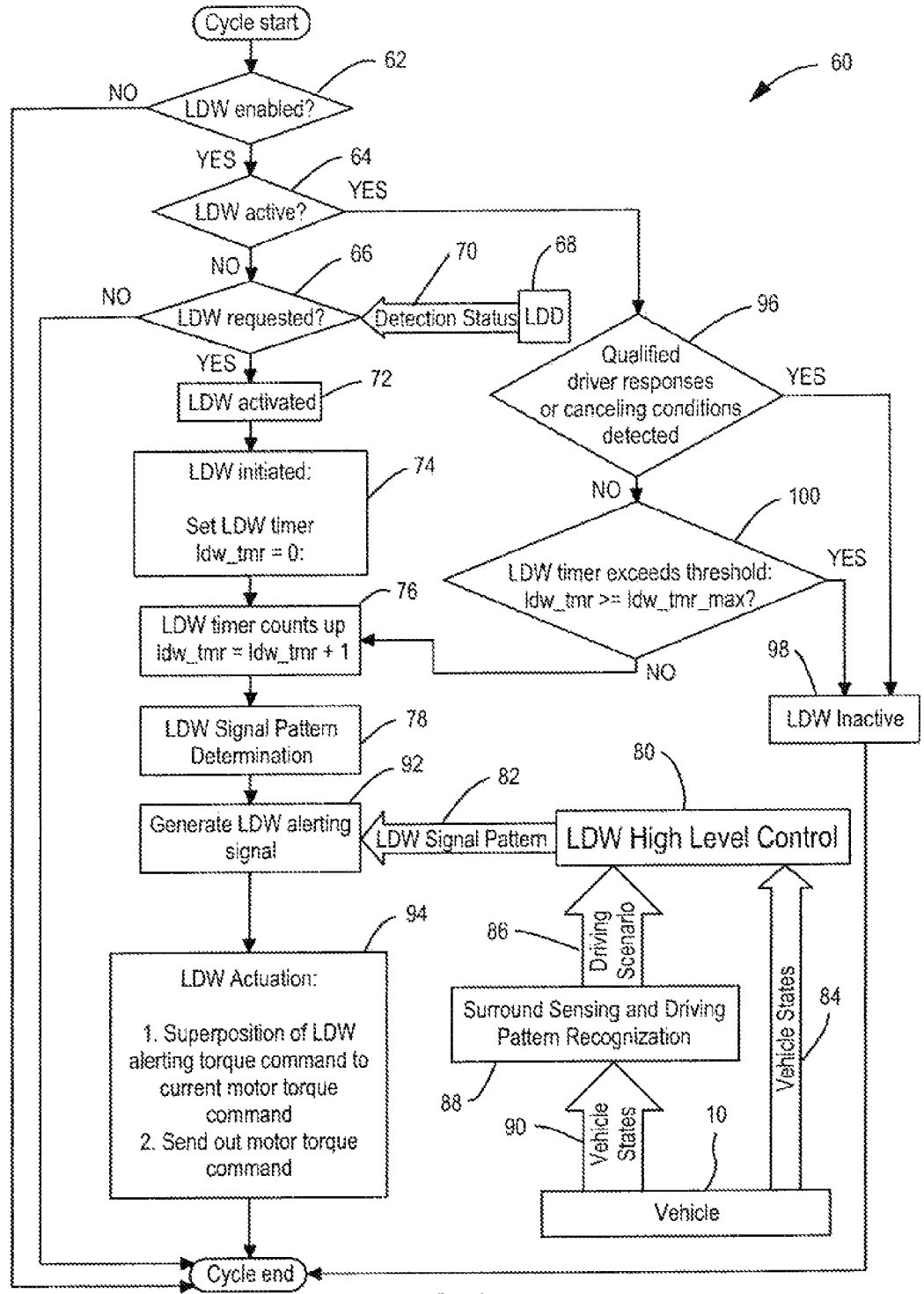
FIG. 3 illustrates a flowchart describing operation of the lane departure warning method and apparatus in accordance with an embodiment of the present invention.

Referring now to FIG. 3, with continual reference to FIGS. 1 and 2, a flowchart 60 describing operation of the lane departure warning method and apparatus for a vehicle such as HEV 10 in accordance with an embodiment of the present invention is shown. A given cycle of the operation of the lane departure warning method and apparatus begins with determining whether the lane departure warning (LDW) is enabled as indicated at decision block 62. If the LDW is not enabled, then the cycle ends. If the LDW is enabled, then it is determined whether the LDW is active as indicated at decision block 64.

If the LDW is not active, then it is determined whether the LDW is requested to be active as indicated at decision block 66. To this end, lane departure detection (LDD) subsystem 68 provides information 70 regarding the position of vehicle relative to its lane to the LDW subsystem. Such information is analyzed to determine whether the LDW is requested. If the LDW is not requested, then the cycle ends.

If the LDW is requested, then the LDW is activated as indicated at block 72. In turn, the LDW is initiated as indicated at block 74. The initiation of the LDW includes setting a timer of the LDW to zero (i.e., "ldw_tmr=0") as indicated in block 74. It is briefly noted that a maximal time duration that allows the LDW activation is designed to limit the vibration to a certain time length determined by the LDW timer. The corresponding timer threshold is denoted by the parameter "ldw_tmr_max" in FIG. 3. After the LDW timer is initiated, the LDW timer is incremented by one unit as indicated at block 76.

Next, the LDW signal pattern is determined as indicated at block 78. To this end, a LDW high level control 80 generates a LDW signal pattern 82. LDW high level control 80 generates LDW signal pattern 82 based on vehicle state information 84 from HEV 10 and on driving scenario information 86. Driving scenario information 86 is provided to LDW high level control 80 by a surround sensing and driving pattern recognizer 88. Surround sensing and driving pattern recognizer 88 generates driving scenario information 86 based on vehicle state information 90 from HEV 10.

After the LDW signal pattern is determined in block 78, the LDW alerting signal (i.e., disturbance alerting signal 46) is generated as indicated at block 92. The LDW is then actuated as indicated at block 94. The LDW actuation includes superposition of the LDW alerting torque command to the current motor torque command to thereby generate a "motor torque command" (i.e., disturbance alerting signal 46+current motor torque command signal 42=resulted motor torque command signal 48) as indicated at block 94. In turn, the generated motor torque command (i.e., resulted motor torque command signal 48) is sent to motor 16. The cycle then ends.

Turning back to decision block 64, if the LDW is active, then it is determined whether to inactivate the LDW in decision block 96. In particular, in decision block 96, it is determined whether a qualified driver response or cancelling condition is detected. If a qualified driver response or cancelling condition is detected, then the LDW is inactivated as indicated at block 98 and the cycle ends.

As an example, a qualified driver response event to the LDW is detected upon one or more of the following conditions with certain parameter thresholds being met: 1. vehicle steering wheel angle changes in the correct correction direction and the change from the start of the warning is larger than a $\delta_{st}$ threshold or the variation rate exceeds a certain threshold $\delta_{std}$ or vehicle steering wheel angle in either direction is larger than a certain threshold (i.e., not only the change in the steering, but also the absolute magnitude); 2. vehicle brake pedal moves and the change since the start of the warning is larger than a $\delta_{brk}$ threshold or the variation rate exceeds a certain threshold $\delta_{bkd}$; and 3. vehicle acceleration pedal varies and the change since the start of the warning is larger than a $\delta_{acc}$ threshold or the variation rate exceeds a certain threshold $\delta_{acd}$.

If a qualified driver response or cancelling condition is not detected in decision block 96, then it is determined whether the LDW timer exceeds or is equal to the corresponding timer threshold (i.e., ldw_tmr≥ldw_tmr_max) as indicated in decision block 100. If the LDW timer is greater than or equal to the corresponding timer threshold, then the LDW is inactivated as indicated at block 98 and the cycle ends. If the LDW timer is less than the corresponding timer threshold, then the process flows to block 76 where the LDW timer is incremented by one unit.

It is to be appreciated that while the LDW is activated the operation of blocks 76, 78, 92, 94, 96, and 100 are repeated until the conditions in either blocks 96 or 100 are satisfied. Each of the iterations through such blocks involves the LDW timer being incremented by one unit.

The warning mechanism of a warning method and apparatus for a vehicle in accordance with embodiments of the present invention can be calibrated to generate different levels of warning. Its sensitivity and strength can be tuned based on event detection severity and the current vehicle operation scenario. For example, the warning can be delayed or be a slack warning when the vehicle speed is relatively low as some drivers frequently cross the lane markings in low speed handling. The warning can be adapted to the type of road. Different exciting disturbance signal pattern can be selected for different LDD events and different driving scenarios. For example, the warning could be more severe in the case of a narrow roadway in order to warn the driver more promptly to avoid off-road collision or lane change in the presence of surrounding traffic.

A warning method and apparatus for a vehicle in accordance with embodiments of the present invention may have the following advantages: 1. low cost with no additional device needed and easy implementation on electric vehicles; 2. simple and quick system actuation enables no interference to vehicle handling and no delay after a detection has been made; 3. the accurate motor torque control enables fine tune alerting torque pattern for better user comfort and acceptance; 4. extension to active vehicle speed adjustment strategy; and 5. enable different warning patterns with respect to driving situations and detection severity.

The lane departure warning method and apparatus for a vehicle such as a HEV in accordance with embodiments of the present invention provides the following features: 1. a method to use the motor of the vehicle to generate sensible alerting effect to a driver in the presence of potential lane departure events; 2. a method to use an additional disturbance torque signal to generate motor torque that excites proper vehicle oscillation; 3. a strategy to enable/disable motor based warning system and associated control methods; 4. a disturbance signal pattern that allows different warning levels with respect to detection severity and driving scenario as well as calibrated parameters to be tuned for better comfort and acceptance; and 5. a method to use motor excited vehicle oscillation as a general warning method not only limited to LDW applications.

As described, characteristics of the lane departure warning method and apparatus for a vehicle such as a HEV in accordance with embodiments of the present invention include a motor of the vehicle generating additional torque other than the motor torque requested during normal vehicle driving and the total motor torque excites vehicle vibration in a certain manner.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method comprising:
   in response to a changed condition in a vehicle having a motor, controlling at least one of propulsion and braking of the vehicle via the motor according to a torque modulation signal that produces a haptic vibration; and
   terminating the controlling of at least one of propulsion and braking of the vehicle via the motor according to the torque modulation signal in response to detection of the changed-condition being terminated.

2. The method of claim 1 further comprising:
   generating the torque modulation signal in response to the changed condition, wherein the torque modulation signal represents a torque other than torque satisfying propulsion and braking of the vehicle as requested by a driver of the vehicle.

3. The method of claim 1 wherein:
   the torque modulation signal contains information representative of vehicle vibration;
   wherein controlling at least one of propulsion and braking of the vehicle via the motor according to the torque modulation signal causes the vehicle to experience the vehicle vibration.

4. The method of claim 1 wherein:
   the torque modulation signal contains information representative of vehicle vibration encountered by the vehicle when the vehicle is traveling over rumble strips or vehicle oscillation patterns.

5. The method of claim 1 further comprising:
   generating a drive torque command indicative of torque satisfying propulsion and braking of the vehicle as requested by a driver of the vehicle;
   wherein at least one of propulsion and braking of the vehicle is controlled via the motor according to the torque modulation signal and the drive torque command.

6. The method of claim 1 wherein:
   the changed-condition is a traffic or obstacle intervention related event.

7. The method of claim 1 wherein:
   the torque modulation signal is a function of at least one of severity of the changed-condition as detected and current vehicle driving conditions.

8. The method of claim 1 wherein the vehicle further includes a braking system configured to brake the vehicle, the method further comprising:
   controlling braking of the vehicle via the braking system according to the torque modulation signal.

9. A method comprising:
   in response to an unintentional lane departure by a vehicle having a motor, controlling at least one of propulsion and braking of the vehicle via the motor according to a torque modulation signal that produces a haptic vibration.

10. The method of claim 9 further comprising:
    terminating the controlling of at least one of propulsion and braking of the vehicle via the motor according to the torque modulation signal in response to the unintentional lane departure by the vehicle being corrected.

11. The method of claim 10 further comprising:
    detecting operation by a driver of the vehicle of at least one of steering wheel, brake pedal, and acceleration pedal of the vehicle in order to determine whether the unintentional lane departure by the vehicle is being corrected.

12. A system for a vehicle having a motor configured to propel and brake the vehicle, the system comprising:
    a detector configured to detect for an event; and
    a warning generator configured to, in response to the event being detected, generate a torque modulation representative of a torque other than torque satisfying propulsion and braking of the vehicle as requested by a driver of the vehicle during the event, the warning generator further configured to provide the torque modulation to the motor such that at least one of propulsion and braking of the vehicle is controlled via the motor according to the torque modulation;
    wherein the event is an unintentional lane departure by the vehicle;
    wherein the detector is an lane departure detector configured to monitor the position of the vehicle relative to a lane;
    wherein the warning generator is a lane departure warning generator configured to generate the torque modulation in response to the unintentional lane departure by the vehicle.

13. The system of claim 12 wherein:
    the torque modulation contains information representative of vehicle vibration encountered by the vehicle when the vehicle is traveling over rumble strips or certain designed vehicle oscillation patterns;
    wherein at least one of propulsion and braking of the vehicle controlled via the motor according to the torque modulation causes the vehicle to experience the vehicle vibration.

14. The system of claim 12 wherein:
    the warning generator is further configured to terminate provision of the torque modulation to the motor in response to the event being terminated.

15. The system of claim 12 wherein:
    the lane departure warning generator is further configured to terminate provision of the torque modulation to the motor in response to operation by the driver of the vehicle of at least one of steering wheel, brake pedal, and acceleration pedal of the vehicle being indicative of the unintentional lane departure by the vehicle being corrected.

16. The system of claim 12 wherein the vehicle further includes a braking system configured to brake the vehicle, wherein:
    the warning generator is further configured to provide the torque modulation to the braking system such that braking of the vehicle is controlled via the braking system according to the torque modulation.

17. A vehicle comprising:
    a motor configured to propel and brake the vehicle; and
    a warning generator configured to, in response to an event being detected, generate a torque modulation representative of a torque other than torque satisfying propulsion and braking of the vehicle as requested by a driver of the vehicle during the event, and to provide the torque modulation to the motor such that at least one of propulsion and braking of the vehicle is controlled via the motor according to the torque modulation;

wherein the warning generator is a lane departure warning generator configured to generate the torque modulation in response to an unintentional lane departure of the vehicle.

18. The vehicle of claim 17 wherein:

the torque modulation contains information representative of vehicle vibration encountered by the vehicle when the vehicle is traveling over rumble strips or certain designed vehicle oscillation patterns;

wherein at least one of propulsion and braking of the vehicle controlled via the motor according to the torque modulation causes the vehicle to experience the vehicle vibration.

19. The vehicle of claim 17 wherein:

the lane departure warning generator terminates provision of the torque modulation to the motor in response to operation by the driver of the vehicle of at least one of steering wheel, brake pedal, and acceleration pedal of the vehicle being indicative of the unintentional lane departure by the vehicle being corrected.

20. The vehicle of claim 17 wherein:

the vehicle is one of a hybrid electric vehicle (HEV), a plug-in hybrid electric vehicle (PHEV), and a battery electric vehicle (BEV).

21. The vehicle of claim 17 wherein:

the motor is one of an electric motor, a hydraulic motor, and a pneumatic motor.

22. The vehicle of claim 17 further comprising:

a braking system configured to brake the vehicle;

wherein the warning generator is further configured to provide the torque modulation to the braking system such that braking of the vehicle is controlled via the braking system according to the torque modulation.

* * * * *